United States Patent [19]

Timtner

[11] Patent Number: 5,058,438
[45] Date of Patent: Oct. 22, 1991

[54] TORQUE MEASURING INSTRUMENT

[75] Inventor: Karlheinz Timtner, Bad Homburg, Fed. Rep. of Germany

[73] Assignee: Ringspann GmbH, Homburg, Fed. Rep. of Germany

[21] Appl. No.: 482,582

[22] Filed: Feb. 21, 1990

[30] Foreign Application Priority Data

Mar. 10, 1989 [DE] Fed. Rep. of Germany ....... 3907707

[51] Int. Cl.⁵ .............................. G01L 3/04
[52] U.S. Cl. .............................. 73/862.32
[58] Field of Search ............... 73/862.32, 862.33

[56] References Cited

U.S. PATENT DOCUMENTS 3,823,608  7/1974  Pantermuehl et al. ......... 73/862.33
4,135,390  1/1979  Templin .
4,809,557  3/1989  Maurer et al. ................. 73/862.32

FOREIGN PATENT DOCUMENTS 0156402  10/1985  European Pat. Off. .
2162366   7/1972  Fed. Rep. of Germany .
2939620   4/1981  Fed. Rep. of Germany .
3708103  10/1987  Fed. Rep. of Germany .

Primary Examiner—Charles A. Ruehl
Attorney, Agent, or Firm—Edwin E. Greigg; Ronald E. Greigg

[57] ABSTRACT

The invention relates to a torque measuring instrument including first and second parts that rotate relative to one another upon torque transmission, the relative rotation of which is transformed by forklike levers into an axial displacement of an adjusting ring. The forklike lever is combined with the first and second parts into a single cast part.

21 Claims, 3 Drawing Sheets

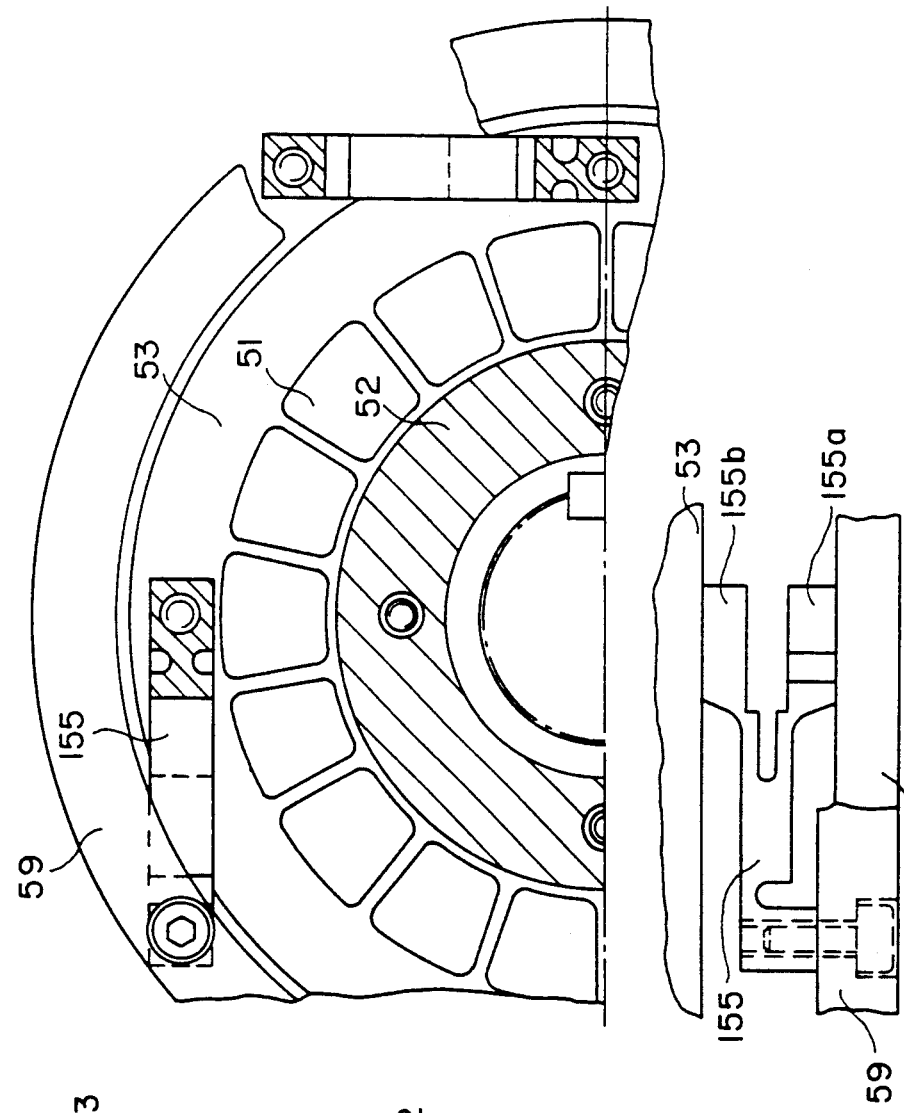
FIG. 4 PRIOR ART
FIG. 5 PRIOR ART
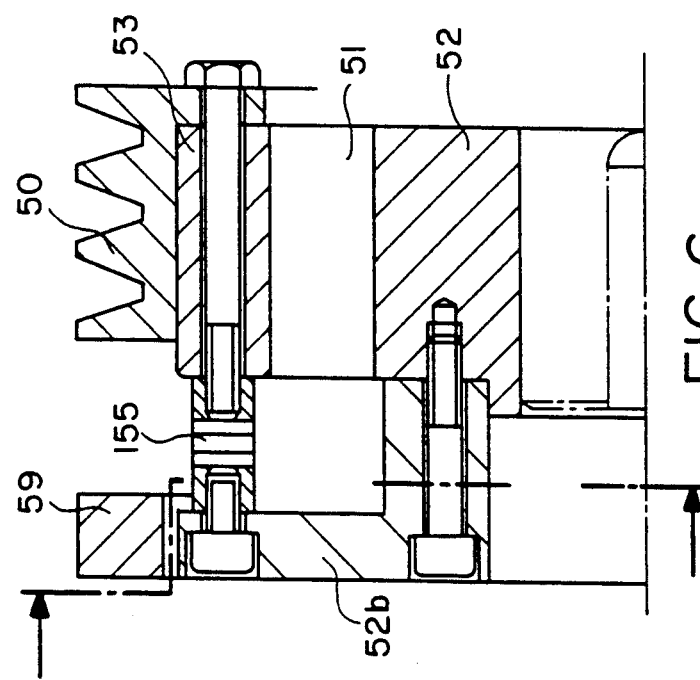
FIG. 6 PRIOR ART

TORQUE MEASURING INSTRUMENT

BACKGROUND OF THE INVENTION

The invention is based on an instrument for measuring a torque carried through a rotatable machine element, by means of first and second parts. The second part is joined to the machine element at an axial and/or radial distance, the first part being secured to the second part by use of a plurality of fork-like elements or levers by which the first and second parts rotate relative to one another upon the passage of a torque through the machine element; the relative circumferential rotation between these first and second parts is translated by means of the plurality of fork-like elements, distributed over the circumference, into an amplified axial motion of a transducer ring, and this axial motion is measured as a standard for the transmitted torque by providing that the levers are forklike in embodiment and are articulated with their two tines to one or the other rotatable part, while contrarily the shank of the fork is articulated on the transducer ring.

A measuring instrument of this kind is known from German Offenlegungsschrift 37 08 103, FIGS. 14–16 which have been included herein in FIGS. 4–6. It is distinguished by high measuring accuracy and reliability.

The forklike lever is made either by milling it out of a solid metal block or by means of individual spring steel elements that are joined at their ends to connection parts, so that they can be screwed to the first and second parts rotating relative to one another and to the transducer ring.

OBJECT AND SUMMARY OF THE INVENTION

An object of the present invention is to lower the production cost for this torque measuring instrument and as a result to open up new areas in which it can be used. According to the invention, this is attained in that the first and second parts that are rotatable relative to one another are embodied, along with the fork tines and the fork shanks of the levers distributed over the circumference, as a one-piece shaped part, in particular a cast part, but optionally also as a one-piece sintered part.

With the combination of a plurality of functional elements to a single component according to the invention, numerous advantages are attained: First, the previously necessary plane-parallel joining faces needed for accurately-fitted connection of the two fork tines with the associated parts rotating relative to one another are dispensed with. Furthermore, the operations of providing connecting bores, adjustment, and assembly in the first place become unnecessary. The measuring instrument according to the invention thus becomes so favorable in terms of manufacture but especially in terms of assembly costs that it meets the requirements for mass-production installation, for instance in a drive train for engine and automatic transmission control of motor vehicles.

The combination of parts according to the invention is suitably made of alloyed cast steel. This involves high quality casting made by any suitable method such as the lost-wax or lost-plastic (Croning) process. However, it is also within the scope of the invention to make the cast part of plastic, for instance by pressure diecasting or injection molding.

Depending on the casting configuration, it is also possible to adapt the cross section of the fork tines and shank, in the sense of a tension that is constant over the length, to the load to be picked up. As a result, the levers and to a certain extent the cast-on parts as well can optionally be dimensioned to suit the local load, because there is a great deal of freedom in terms of the shape and cross section of the cast parts.

In a further advantageous feature of the invention, the transducer ring is integrated with the shaped part. As a result, all the parts needed for measuring torque are combined in a monolithic block that need merely be installed in the drive train to be monitored.

It is also recommended that the transducer ring be embodied as a profile ring. This makes it lighter, and the vibration system comprising the mass of the transducer ring and the spring stiffness of the fork tines has a higher natural frequency and thus cannot be excited easily by vibrations of the machine parts to be measured.

The joints by which the lever is joined to its connecting parts can also be well integrated into the cast construction. In terms of the articulation of the fork shank on the transducer ring, it is recommended that the end of the fork shank be bent by 90° and that this bent region be embodied as a joint. By comparison, the joint operative in the radial direction, which is provided on one fork tine, can be embodied by a suitably cast flat bar cross section of the tine.

The invention will be better understood and further objects and advantages thereof will become more apparent from the ensuing detailed description of preferred embodiment taken in conjunction with the drawings.

BRIEF DESCRIPTION OF THE DRAWINGS

FIGS. 4–6 illustrates the prior art.

DESCRIPTION OF THE PREFERRED EMBODIMENT

Figure 1:
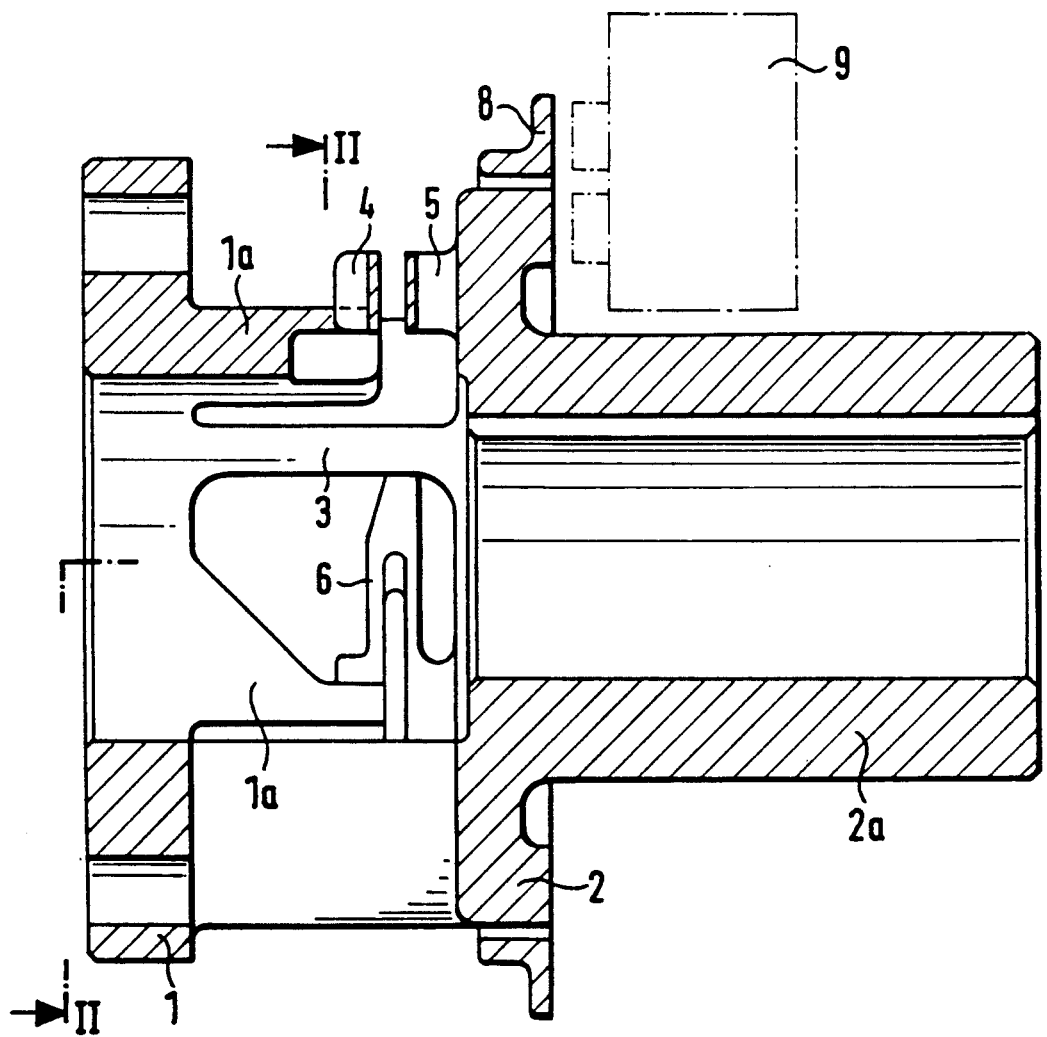
FIG. 1 is an axial section through the measuring instrument.

In the exemplary embodiment, the measuring instrument is embodied as a hublike part; its first and second disk-like parts that rotate relative to one another upon torque transmission are identified by reference numerals 1 and 2, respectively; first part 1 is embodied as a flange ring with assembly bores distributed near its circumference, while second part 2 has an axially extending hub 2a that can be mounted on a shaft, not shown, via internal teeth, an adjusting spring or the like.

The first and second disk-like parts 1 and 2 are connected to one another via numerous axially extending beams 3 distributed over the circumference. These beams are dimensioned such that upon transmission of a torque through the measuring instrument, a relative rotation is brought about between the first and second parts 1 and 2.

To detect this relative rotation, the parts 1 and 2 are connected to the tines 4 and 5, respectively, of a plurality of fork-like elements 6 distributed over the circumference. The tines 4 and 5 are axially aligned with one another, while the forklike element 6 extends approximately at a tangent. Its fork shank 7 is connected at the end to a transducer ring 8.

Up to this point, the same principle applies as of German Offenlegungsschrift 37 08 103: Upon torque transmission, a torque-proportional relative rotation occurs between first and second disk-like parts 1 and 2, and via the fork-like elements 6 this rotation in turn causes an axial displacement of the transducer ring 8. The direction and extent of this adjustment are dependent on the direction of rotation and on the torque transmitted and are detected in a non-contacting manner by a travel measuring instrument 9. As a reference, another part of the measuring instrument is used, in the exemplary embodiment the second part 2, which is spaced from and located radially inside the transducer ring 8, so that thermal expansion and the like will not result in incorrect measurement findings. For further details, refer to FIGS. 4, 5 and 6 which illustrate the prior art.

The prior art shown in FIGS. 4–6 show a similar structure to that of the invention. In this example a relatively solid lever 155 is used. It may be made by milling out of a solid material and is as a result substantially stiff. As a result, a high natural frequency of the elastic system comprising the lever and the transducer ring is obtained, which substantially reduces the danger that the transducer ring display accuracy will be impaired by vibration.

As can be seen particularly in FIG. 5, the forklike lever 155 comprises two parallel tines 155a and 155b, which are joined to the two parts 52 and 53 that rotate relative to one another. Since here the articulation points of the two tines are axially aligned with one another, the inner one of the two parts 52 rotating relative to one another is drawn outward via an angle ring 52b until it is approximately on the radius of the outer part 53. Thus, the lever 155 can be mounted with its tines on mutually facing plane sides 52b and 53. The other end, or in other words the top part, is mounted on the transducer ring 59 and displaces it more or less markedly in one or the other axial direction, depending on the angle and direction of the rotation generated between the parts 52 and 53.

Since the described rotation between the parts 52 and 53 also leads to a crossing of the pivot points of the tines 155a and 155b, one of the two tines can suitably be secured to the part 52b or 53 via a joint that yields in the radial direction. Furthermore, to damp vibration, it may be suitable to combine the knee levers with damping material, or to fill the space between the adjusting member 59 and its neighboring ring (in this case the angle ring 52b) with elastic or plastic compositions.

Figure 2:
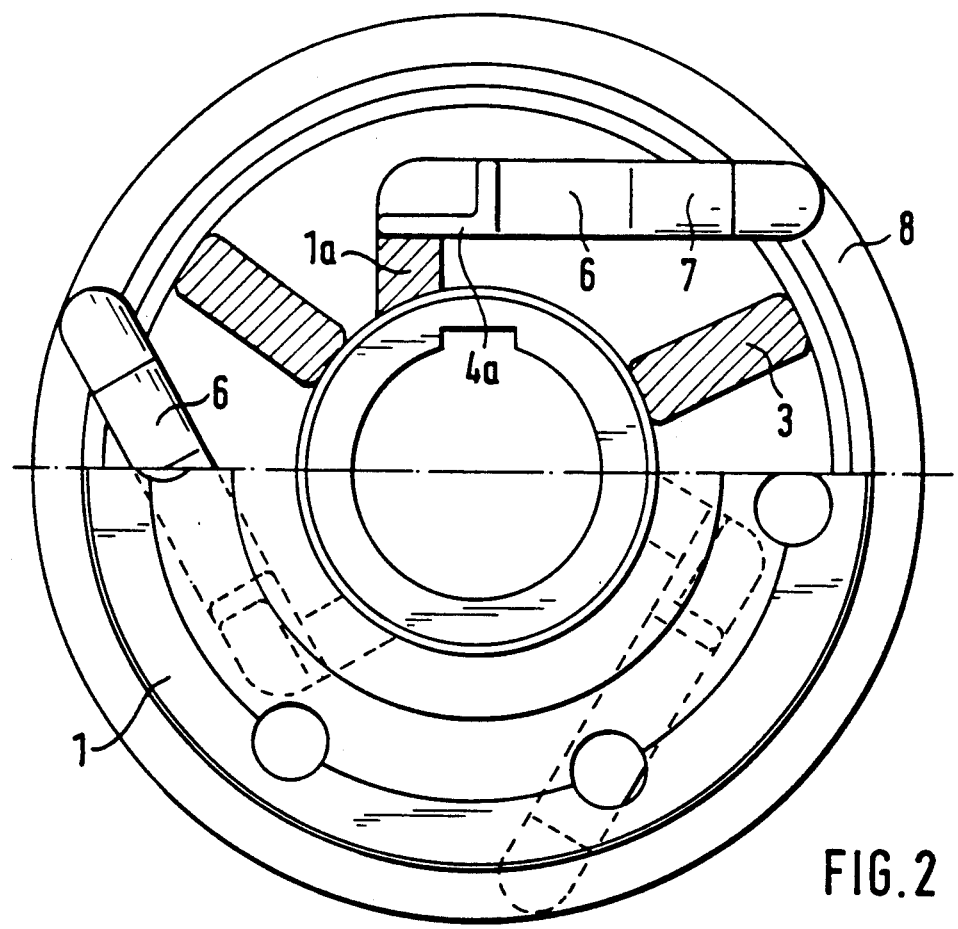
FIG. 2 shows a cross section along the line II—II of FIG. 1.
Figure 3:
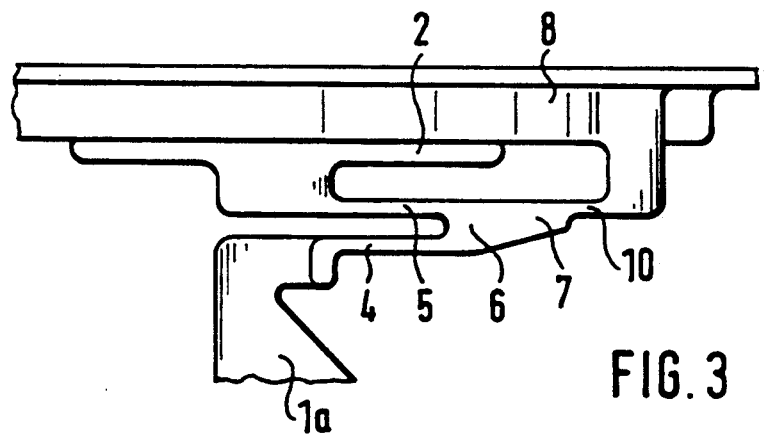
FIG. 3 shows a detail of a radial plan view of FIG. 2.

An essential point of this invention is that the tines 4 and 5, the fork shank 7 and the first and second disk-like parts 1 and 2 rotating relative to one another are combined as one piece into a common cast body. The tines 4 and 5 are accordingly cast onto the parts 1 and 2 directly, with the inclusion of a bridge 1a. As can be seen particularly in FIG. 3, the joint operative in the axial direction, between the fork shank and the transducer ring 8 is no longer embodied by a local restriction but rather as a bent spring arm. It can correspondingly be seen in FIG. 2 as well that the joint that is operative in the radial direction between the tines 4 and the bridge 1a is not formed by a milling operation but rather by means of a flat transverse beam 4a.

In the exemplary embodiment shown, the transducer ring 8 is also integrally cast with the fork shank 7 as well, or in other words is likewise joined in one piece to the fork-like elements 6.

Thus the entire measuring instrument may be made throughout of alloyed cast steel or a corresponding plastic.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A unitary measuring instrument for measuring torque, which comprises first and second disk-like parts (1, 2) which are rotatable about a common axis spaced from each other and connected together by extending integral beams (3), a plurality of fork-like elements (6) each including two tines (4, 5) and a fork shaft (7), and a cylindrical transducer ring 8; one tine (4) of each fork-like element being connected to said first disk-like part (1), the other tine (5) of each fork-like element being connected to said second disk-like part (2), and each of said fork shanks (7) of each of said fork-like elements being connected at an end thereof to said transducer ring (8), wherein a relative rotation about said common axis between said first and second disk-like parts (1, 2) caused by the passage of a torque through said measuring instrument is translated by means of said plurality of fork-like elements (6) distributed along a circumference of said transducer ring into an amplified axial motion of said transducer ring (8), and this axial motion is measured as a standard for the transmitted torque, said first and second disk-like parts (1, 2) and said integral beams (3) are embodied along with said two tines (4, 5), and said fork shanks (7) of the fork-like elements (6) as a one-piece shaped part.

2. A unitary measuring instrument as defined by claim 1, in which said unitary measuring instrument is formed of alloyed cast steel.

3. A unitary measuring instrument as defined by claim 2, in which said two fork tines (4, 5) and said fork shanks (7) have cross-sections such that a torque produced by a load produces a constant tension over their length.

4. A unitary measuring instrument as defined by claim 2, in which said transducer ring (8) is integrally cast with the fork shanks (7).

5. A unitary measuring instrument as defined by claim 2, in which each said fork shank (7) is bent on its end by 90° toward said transducer ring (8), and its bent end is embodied as a unitary joint (10) with said transducer ring.

6. A unitary measuring instrument as defined by claim 2, wherein each said one tine (4) has a joint (4a) acting in a radial direction and said joint (4a) is formed by a flat bar cross section of each said one tine (4).

7. A unitary measuring instrument as defined by claim 1, in which said unitary measuring instrument is formed of plastic.

8. A unitary measuring instrument as defined by claim 7, in which said two fork tines (4, 5) and said fork shanks (7) have cross-sections such that a torque produced by a load produces a constant tension over their length.

9. A unitary measuring instrument as defined by claim 7, in which said transducer ring (8) is integrally cast with the fork shanks (7).

10. A unitary measuring instrument as defined by claim 7, in which each said fork shank (7) is bent on its end by 90° toward said transducer ring (8), and its bent end is embodied as a unitary joint (10) with said transducer ring.

11. A unitary measuring instrument as defined by claim 7, wherein each said one tine (4) has a joint (4a) acting in a radial direction and said joint (4a) is formed by a flat bar cross section of each said one tine (4).

12. A unitary measuring instrument as defined by claim 1, in which said two fork tines (4, 5) and said fork shanks (7) have cross-sections such that a torque produced by a load produces a constant tension over their length.

13. A unitary measuring instrument as defined by claim 12, in which said transducer ring (8) is integrally cast with the fork shanks (7).

14. A unitary measuring instrument as defined by claim 12, in which each said fork shank (7) is bent on its end by 90° toward said transducer ring (8), and its bent end is embodied as a unitary joint (10) with said transducer ring.

15. A unitary measuring instrument as defined by claim 12, wherein each said one tine (4) has a joint (4a) acting in a radial direction and said joint (4a) is formed by a flat bar cross section of each said one tine (4).

16. A unitary measuring instrument as defined by claim 1, in which said transducer ring (8) is integrally cast with the fork shanks (7).

17. A unitary measuring instrument as defined by claim 16, in which each said fork shank (7) is bent on its end by 90° toward said transducer ring (8), and its bent end is embodied as a unitary joint (10) with said transducer ring.

18. A unitary measuring instrument as defined by claim 16, wherein each said one tine (4) has a joint (4a) acting in a radial direction and said joint (4a) is formed by a flat bar cross section of each said one tine (4).

19. A unitary measuring instrument as defined by claim 1, in which each said fork shank (7) is bent on its end by 90° toward said transducer ring (8), and its bent end is embodied as a unitary joint (10) with said transducer ring.

20. A unitary measuring instrument as defined by claim 1, wherein each said one tine (4) has a joint (4a) acting in a radial direction and said joint (4a) is formed by a flat bar cross section of each said one tine (4).

21. A unitary measuring instrument as defined by claim 19, wherein each said one tine (4) has a joint (4a) acting in a radial direction and said joint (4a) is formed by a flat bar cross section of each said one tine (4).

* * * * *